(12) United States Patent
Lee et al.

(10) Patent No.: US 8,368,865 B2
(45) Date of Patent: Feb. 5, 2013

(54) DISPLAY PANEL AND METHOD OF MANUFACTURING THE SAME

(75) Inventors: Jeongho Lee, Seoul (KR); Woo Yong Sung, Seoul (KR); Taewoon Cha, Seoul (KR); TaeGyun Kim, Seoul (KR); Sanggun Choi, Suwon-si (KR); Jihyun Bae, Seoul (KR); Hyoung Wook Lee, Asan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 237 days.

(21) Appl. No.: 12/889,086

(22) Filed: Sep. 23, 2010

(65) Prior Publication Data
US 2011/0216281 A1 Sep. 8, 2011

(30) Foreign Application Priority Data
Mar. 5, 2010 (KR) ........................ 10-2010-0019732

(51) Int. Cl.
*G02F 1/1339* (2006.01)
(52) U.S. Cl. ........................ 349/157; 349/155
(58) Field of Classification Search ........... 349/155–157
See application file for complete search history.

(56) References Cited

U.S. PATENT DOCUMENTS

| | | | | |
|---|---|---|---|---|
| 6,396,559 B1* | 5/2002 | Kishimoto et al. | ............ | 349/156 |
| 6,924,871 B2* | 8/2005 | Washizawa et al. | ........... | 349/156 |
| 7,492,435 B2* | 2/2009 | Jeon | .............................. | 349/155 |
| 7,570,338 B2* | 8/2009 | Yoon et al. | ..................... | 349/155 |
| 7,773,188 B2* | 8/2010 | Park | ............................... | 349/155 |
| 7,796,232 B2* | 9/2010 | Park et al. | ...................... | 349/155 |
| 7,796,233 B2* | 9/2010 | Park et al. | ...................... | 349/155 |
| 7,812,916 B2* | 10/2010 | Hashimoto | ................... | 349/155 |
| 7,969,545 B2* | 6/2011 | Lee | ................................. | 349/155 |
| 8,111,370 B2* | 2/2012 | Yamada et al. | ............... | 349/157 |
| 2004/0114090 A1* | 6/2004 | Washizawa et al. | ........ | 349/158 |
| 2005/0122446 A1* | 6/2005 | Jeon | .............................. | 349/110 |
| 2006/0114377 A1* | 6/2006 | Yen et al. | ....................... | 349/106 |
| 2006/0152667 A1* | 7/2006 | Jeon et al. | ...................... | 349/155 |
| 2006/0281211 A1* | 12/2006 | Yoon et al. | ...................... | 438/34 |
| 2007/0002261 A1* | 1/2007 | Lee et al. | ...................... | 349/155 |
| 2007/0008479 A1* | 1/2007 | Suh et al. | ....................... | 349/155 |
| 2007/0097312 A1* | 5/2007 | Park et al. | ...................... | 349/155 |
| 2007/0247583 A1* | 10/2007 | Park | ............................... | 349/155 |
| 2008/0266498 A1* | 10/2008 | Kim et al. | ...................... | 349/110 |
| 2009/0009709 A1* | 1/2009 | Niiya | ............................. | 349/156 |
| 2009/0103039 A1* | 4/2009 | Satoh | ............................. | 349/155 |
| 2009/0122241 A1* | 5/2009 | Satoh | ............................. | 349/106 |

(Continued)

FOREIGN PATENT DOCUMENTS

| | | |
|---|---|---|
| JP | 08-194216 | 7/1996 |
| JP | 2005-258137 | 9/2005 |

(Continued)

*Primary Examiner* — Rhonda Peace
(74) *Attorney, Agent, or Firm* — F.Chau & Associates, LLC

(57) ABSTRACT

A display panel includes a first substrate, a second substrate facing the first substrate, and a pixel disposed on either the first substrate or the second substrate. When an electrode is formed, a portion of the electrode is removed to form a spacer area and a droplet including a bead spacer mixed with a solvent is provided in the spacer area. Then, the solvent is vaporized to move the bead spacer to a center of the spacer area. The second substrate is provided to face the first substrate while interposing the bead spacer therebetween. The spacer area has a dimension equal to or greater than a diameter of the droplet.

16 Claims, 15 Drawing Sheets

U.S. PATENT DOCUMENTS

| | | | |
|---|---|---|---|
| 2010/0073613 A1* | 3/2010 | Yamada et al. | 349/110 |
| 2011/0216281 A1* | 9/2011 | Lee et al. | 349/155 |

FOREIGN PATENT DOCUMENTS

| | | |
|---|---|---|
| JP | 2007-279610 | 10/2007 |
| JP | 2008-256993 | 10/2008 |
| JP | 2008-281740 | 11/2008 |
| KR | 1020040062204 A | 7/2004 |
| KR | 1020080062104 | 7/2008 |

* cited by examiner

DISPLAY PANEL AND METHOD OF MANUFACTURING THE SAME

CROSS-REFERENCE TO RELATED APPLICATION

This application claims priority to Korean Patent Application No. 2010-19732 filed on Mar. 5, 2010, the contents of which are herein incorporated by reference in its entirety.

BACKGROUND

1. Technical Field

Embodiments of the present invention relate to a display panel including a bead spacer and a method of manufacturing the display panel.

2. Discussion of the Related Art

In general, a liquid crystal display includes a liquid crystal display panel including a first substrate, a second substrate, and a liquid crystal layer interposed between the first and second substrates.

The liquid crystal display displays an image using the liquid crystal layer in which liquid crystal molecules are arranged in response to voltages applied to the first and second substrates. However, a nonuniform cell gap between the first and second substrates causes variations in thickness of the liquid crystal layer, thereby distorting the image.

To maintain the uniform cell gap, a spacer is disposed between the first and second substrates. The spacer may be classified as a column spacer and a bead spacer. When the bead spacer is applied to the liquid crystal display, there are situations where the uniform cell gap is not maintained because the bead spacer is difficult to form at a desired position.

SUMMARY

Exemplary embodiments of the present invention provide a display panel including a bead spacer, and a method of manufacturing the display panel.

According to an exemplary embodiment, a method of manufacturing a display panel including a pixel formed on either a first substrate or a second substrate facing the first substrate to display an image is provided as follows. When an electrode is formed on the first substrate, a portion of the electrode is removed to form a spacer area. Then, a droplet including a bead spacer mixed with a solvent is provided to the spacer area, and the solvent is vaporized to move the bead spacer to a central portion of the spacer area. The second substrate is provided to face the first substrate while disposing the bead spacer between the first substrate and the second substrate. The spacer area has a dimension equal to or greater than a diameter of the droplet.

According to an exemplary embodiment, a method of manufacturing a display panel including a pixel formed on either a first substrate or a second substrate facing the first substrate to display an image is provided as follows. A light blocking material is provided on the first substrate, and the light blocking material is patterned to form a black matrix through which openings are formed in a matrix configuration. Then, a droplet including a bead spacer mixed with a solvent is provided at least above an area where the black matrix is formed, and the solvent is vaporized to move the bead spacer to above the area where the black matrix is formed. The second substrate is provided to face the first substrate while disposing the bead spacer between the first substrate and the second substrate. An end portion of the black matrix that defines the openings has a tapered shape.

According to an exemplary embodiment, a display panel, including a bead spacer provided from a droplet including the bead spacer mixed with a solvent, includes a first substrate including an electrode having a spacer area, a second substrate facing the first substrate while interposing the bead spacer in the spacer area between the first substrate and the second substrate, and a plurality of pixels disposed on either the first substrate or the second substrate. The spacer area has a dimension equal to or greater than a diameter of the droplet.

According to an exemplary embodiment, a display panel includes a first substrate including a black matrix through which a plurality of openings are formed, a second substrate facing the first substrate, and a plurality of pixels disposed on either the first substrate or the second substrate. An end portion of the black matrix that defines the openings has a tapered shape.

When the droplet is sprayed to a desired position by using an inkjet process and the solvent in the droplet is vaporized, the bead spacer may be easily gathered on the area where the droplet is sprayed. Accordingly, the cell gap between the first and second substrates may maintain a uniform distance, thereby improving display properties of the display panel.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to"

another element or layer, it can be directly on, connected or coupled to the other element or layer or intervening elements or layers may be present. Like numbers may refer to like elements throughout the drawings and the specification.

Figure 1:
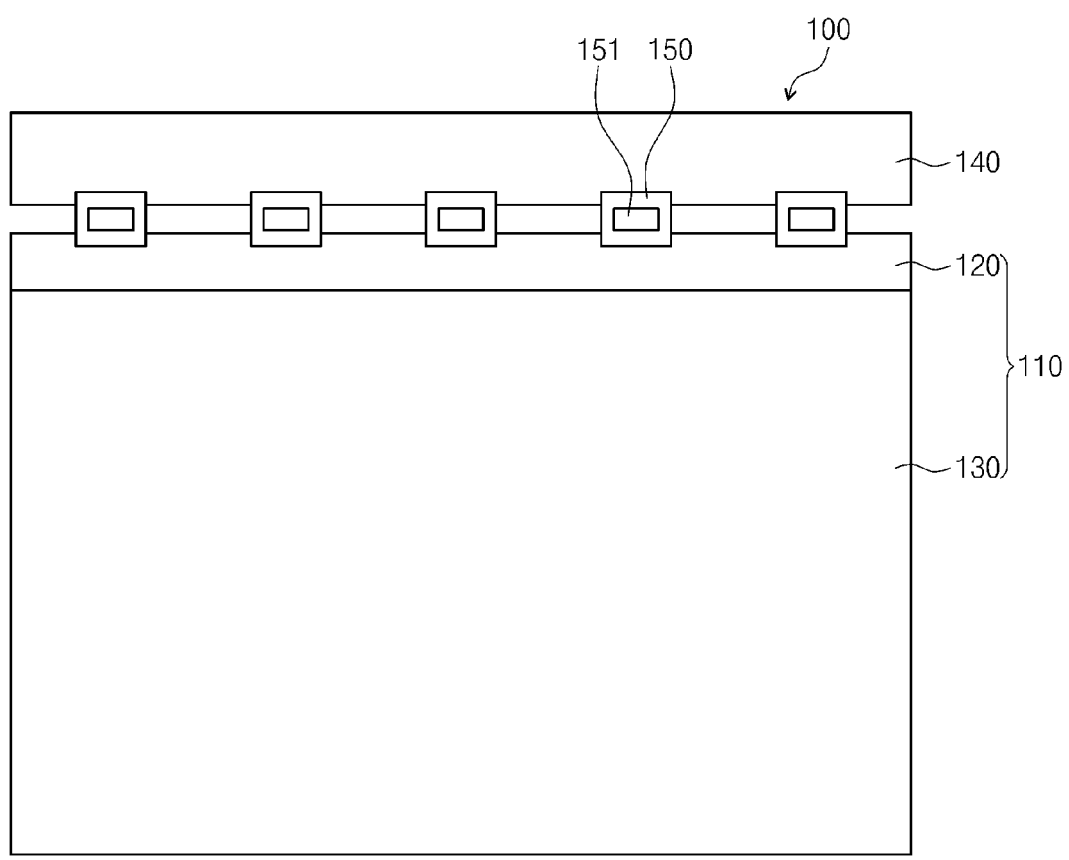
FIG. 1 is a plan view showing a display unit according to an exemplary embodiment of the present invention.

FIG. 1 is a plan view showing a display unit according to an exemplary embodiment of the present invention.

Referring to FIG. 1, a display unit 100 includes a display panel 110 displaying an image and a printed circuit board 140 providing the display panel 110 with a driving signal. The printed circuit board 140 is disposed adjacent to a side of the display panel 110.

The display panel 110 includes a first substrate 120, a second substrate 130 facing the first substrate 120, and a liquid crystal layer (not shown) disposed between the first and second substrates 120 and 130.

The printed circuit board 140 is connected with the display panel 110 by a plurality of tape carrier packages 150, and driving chips 151 are mounted on the tape carrier packages 150, respectively.

Each of the driving chips 151 may include a data driver therein to provide a data signal to the display panel 110. In this case, a gate driver (not shown) that provides a gate signal to the display panel 110 may be directly formed on the display panel 110 through a thin film process. In addition, the driving chips 151 may be mounted on the display panel 110 in a chip-on-glass manner, so that the driving chips 151 may be integrated in a single chip.

Figure 2A:
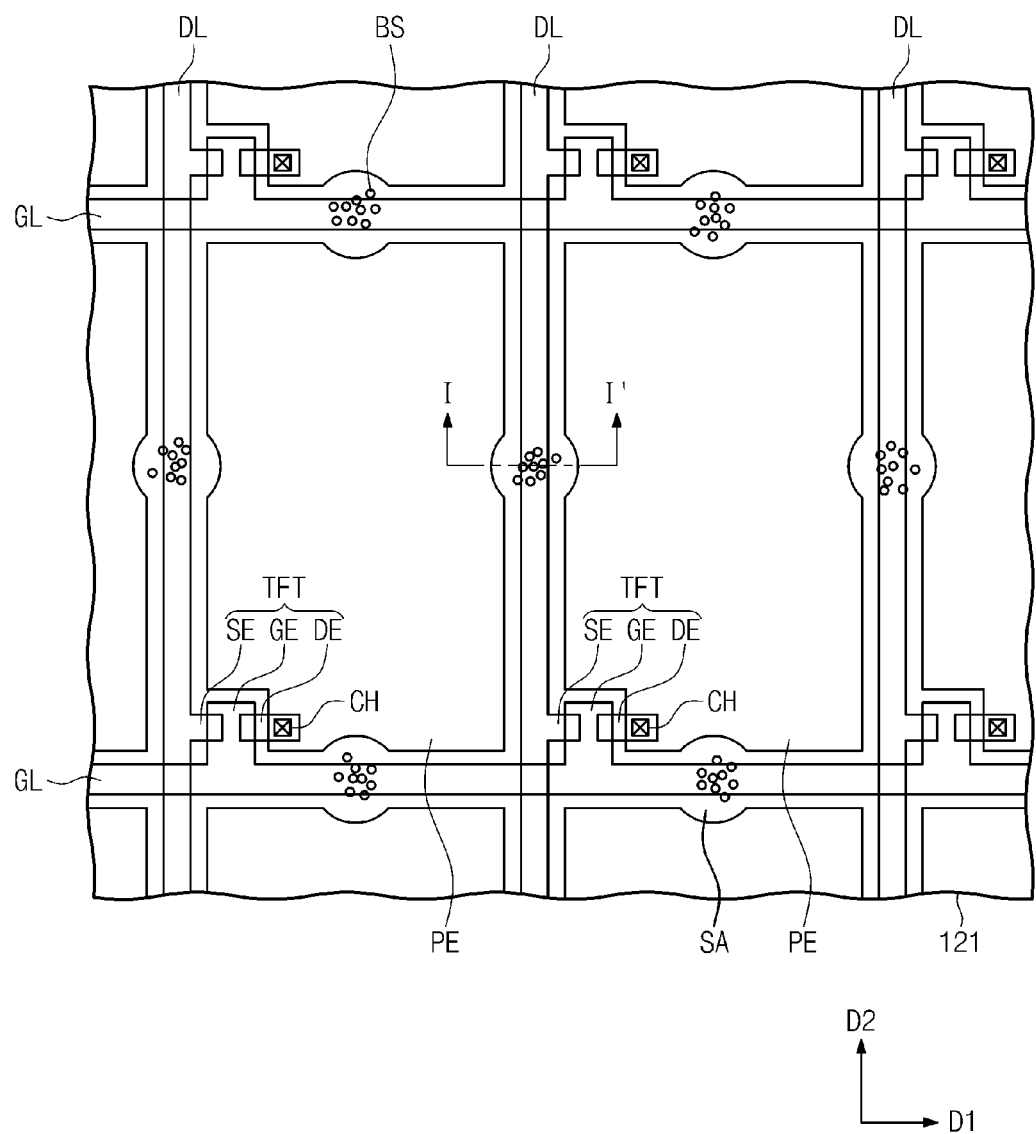
FIG. 2A is a plan view showing a first substrate of FIG. 1 according to an exemplary embodiment of the present invention.
Figure 2B:
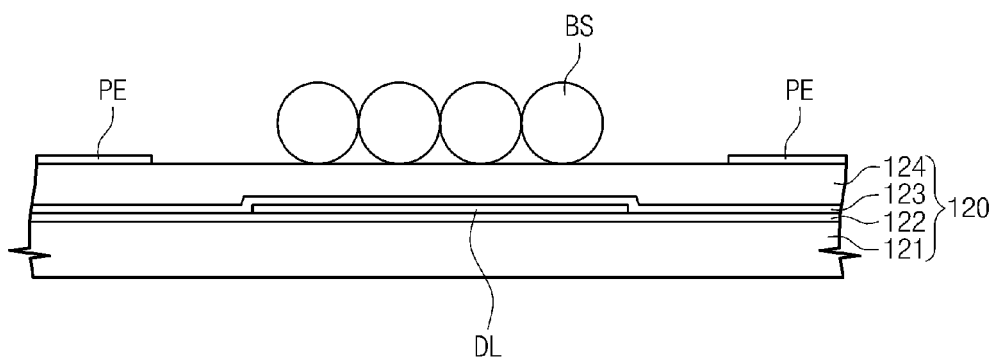
FIG. 2B is a cross-sectional view taken along a line I-I' of FIG. 2A.

FIG. 2A is a plan view showing a first substrate of FIG. 1 according to an exemplary embodiment of the present invention, and FIG. 2B is a cross-sectional view taken along a line I-I' of FIG. 2A.

Referring to FIGS. 2A and 2B, the first substrate 120 includes a first base substrate 121 and a plurality of pixels formed on the first base substrate 121.

According to an exemplary embodiment, the pixels have the same structure and function and for purposes of brevity, two pixels adjacent to each other, and gate and data lines associated with the two pixels have been shown in FIG. 2A. Each pixel includes a thin film transistor TFT and a pixel electrode PE electrically connected to the thin film transistor TFT.

The gate line GL and the data line DL cross each other and are insulated from each other on the first base substrate 121 of the first substrate 120. The gate line GL extends in a first direction D1 and the data line DL extends in a second direction D2 substantially perpendicular to the first direction D1. An insulating layer 122 is disposed between the gate line GL and the data line DL.

The thin film transistor TFT includes a gate electrode GE, a source electrode SE, and a drain electrode DE and is electrically connected to the gate line GL and the data line DL. In detail, the gate electrode GE is branched from the gate line GL, the source electrode SE is branched from the data line DL, and the drain electrode DE is disposed apart from the source electrode SE and connected to the pixel electrode PE through a contact hole CH.

A spacer area SA, in which a droplet including bead spacers BS and a solvent (not shown) is formed is defined between two pixel electrodes PE adjacent to each other. The spacer area SA may have various shapes, such as, for example, a circular shape, a square shape, a rectangular shape, a polygonal shape, etc. When the spacer area SA is provided in the circular shape, the spacer area SA has a diameter equal to or greater than a diameter of the droplet. In addition, when the spacer area SA is provided in the square shape, the spacer area SA has a side length equal to or greater than the diameter of the droplet.

Hereinafter, the term "dimension" will be used to indicate the diameter or one side length of the spacer area SA. For instance, when the spacer area SA has the rectangular shape, an expression that the dimension of the spacer area SA is equal to or greater than the diameter of the droplet means that a short side of the rectangular shape is equal to or greater than the diameter of spacer area SA. In other words, the spacer area SA may have a size sufficient to receive the droplet therein.

The bead spacers BS are positioned in the spacer area SA to maintain the cell gap of the liquid crystal layer (not shown) disposed between the first and second substrates 120 and 130. In general, when the bead spacer BS is disposed on the pixel electrode PE, the pixel electrode PE may be damaged when the bead spacer BS is overloaded. Therefore, when the bead spacer BS is positioned in the spacer area SA rather than on the pixel electrode PE, the pixel electrode PE may be prevented from being damaged, thereby preventing defects of the pixels.

According to an exemplary embodiment, nine bead spacers may be included in one spacer area SA as shown in FIG. 2A and FIG. 2B, respectively, but the present invention should not be limited thereto, and more or less spacers may be included in a spacer area SA. For example, four bead spacers may be included in one spacer area. Although not shown in the figures, the gate electrode GE is disposed on the first base substrate 121 of the first substrate 120. The gate electrode GE is covered by the insulating layer 122. An active layer (not shown) and an ohmic contact layer (not shown) are disposed on the insulating layer 122 at an area corresponding to an area in which the gate electrode GE is formed. Thus, the source electrode SE and the drain electrode DE face the gate electrode GE, with the insulating layer 122, the active layer, and the ohmic contact layer interposed between the gate electrode GE and the source and drain electrodes SE and DE.

The first thin film transistor 120a may be covered by a passivation layer 123. In addition, an organic insulating layer 124 may be further formed on the passivation layer 123.

The passivation layer 123 and the organic insulating layer 124 have the contact hole CH formed therethrough, so that the drain electrode DE of the thin film transistor TFT is exposed through the contact hole CH. The pixel electrode PE is formed on the organic insulating layer 124 and electrically connected to the drain electrode DE through the contact hole CH.

In FIG. 2A, the spacer area SA is formed on the gate line GL and the data line DL, so the bead spacers BS are disposed on both the gate line GL and the data line DL, but the present invention should not be limited thereto or thereby. For example, the spacer area SA may be formed on either the gate line GL or the data line DL, and thus the bead spacers BS may be formed on either the gate line GL or the data line DL. In addition, the number of the spacer areas SA formed on one gate line GL or one data line DL may be varied.

Figure 3A:
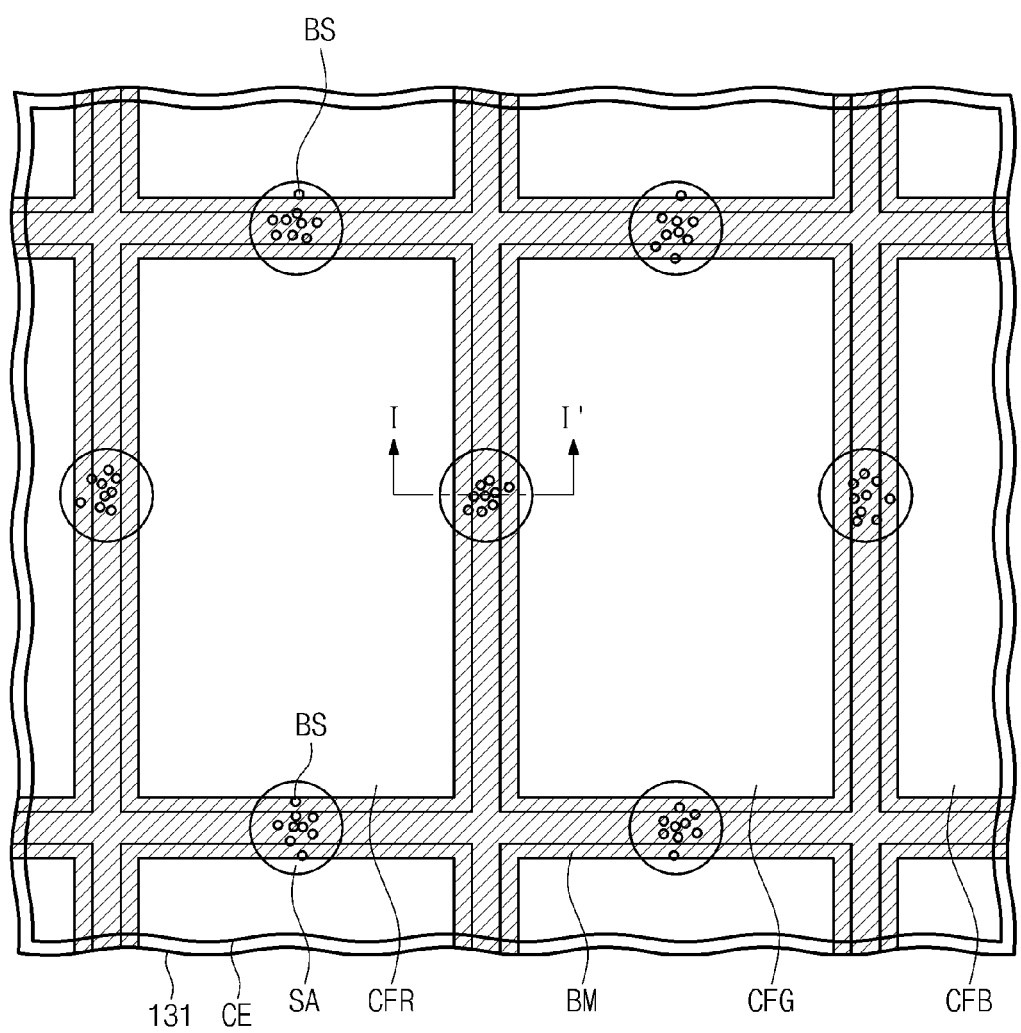
FIG. 3A is a plan view showing a second substrate of FIG. 1 according to an exemplary embodiment of the present invention.
Figure 3B:
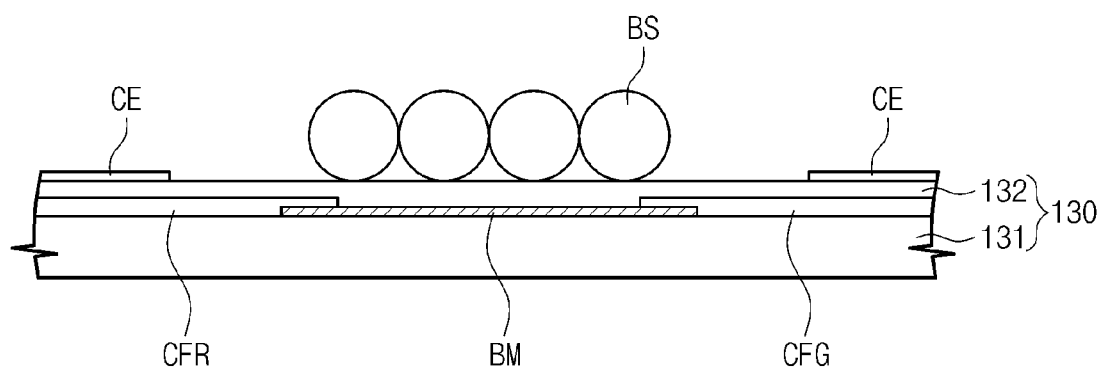
FIG. 3B is a cross-sectional view taken along a line I-I' of FIG. 3A.

FIG. 3A is a plan view showing a second substrate of FIG. 1 according to an exemplary embodiment of the present invention, and FIG. 3B is a cross-sectional view taken along a line I-I' of FIG. 3A.

Referring to FIGS. 3A and 3B, the second substrate 130 includes a second base substrate 131, a plurality of color filters CFR, CFG, and CFB, a leveling layer 132, and a common electrode CE.

The color filters have the same structure and function except for colors thereof, and thus, for purposes of brevity, two color filters adjacent to each other and a surrounding area have been shown in FIG. 3A.

The second base substrate 131 of the second substrate 130 may include a transparent insulative material, such as glass, and a black matrix BM including a light blocking material is disposed on the second base substrate 131 in a matrix configuration to prevent light leakage in a non-display area. The non-display area corresponds to an area between adjacent pixel electrodes of the first base substrate 121.

Red, green, and blue color filters CFR, CFG, and CFB are disposed on the second base substrate 131 to correspond to a display area. The display area indicates an area corresponding to the pixel electrode PE of the first base substrate 121.

The red, green, and blue color filters CFR, CFG, and CFB have red, green, and blue color pixels R, G, and B, respectively, and selectively transmit light having a specific wavelength. In addition, the color filters CFR, CFG, and CFB may be formed such that their end portions overlap the black matrix BM.

The leveling layer 132 may be disposed on the color filters CFR, CFG, and CFB and the black matrix BM to planarize the surface of the second base substrate 131 on which the color filters CFR, CFG, and CFB and the black matrix BM are formed. To this end, the leveling layer 132 has a predetermined thickness and reduces the step difference between the black matrix BM and the color filters CFR, CFG, and CFB.

The common electrode CE is formed on the leveling layer to have a uniform thickness. The common electrode CE may include a transparent conductive material, such as indium tin oxide or indium zinc oxide, and face the pixel electrode PE to form an electric field.

The common electrode CE includes a spacer area SA in which the droplet (not shown) including the bead spacers BS and the solvent is formed. The spacer area SA has a dimension equal to or greater than a diameter of the droplet. The bead spacers BS are arranged in the spacer area SA to maintain the cell gap of the liquid crystal layer (not shown) disposed between the first and second substrates 120 and 130.

As shown in FIGS. 3A and 3B, the second substrate 130 includes the color filters CFR, CFG, and CFB and the leveling layer 132, but, according to an embodiment, the color filters CFR, CFG, and CFB and the leveling layer 132 may be omitted from the second substrate 130.

Figure 4A:
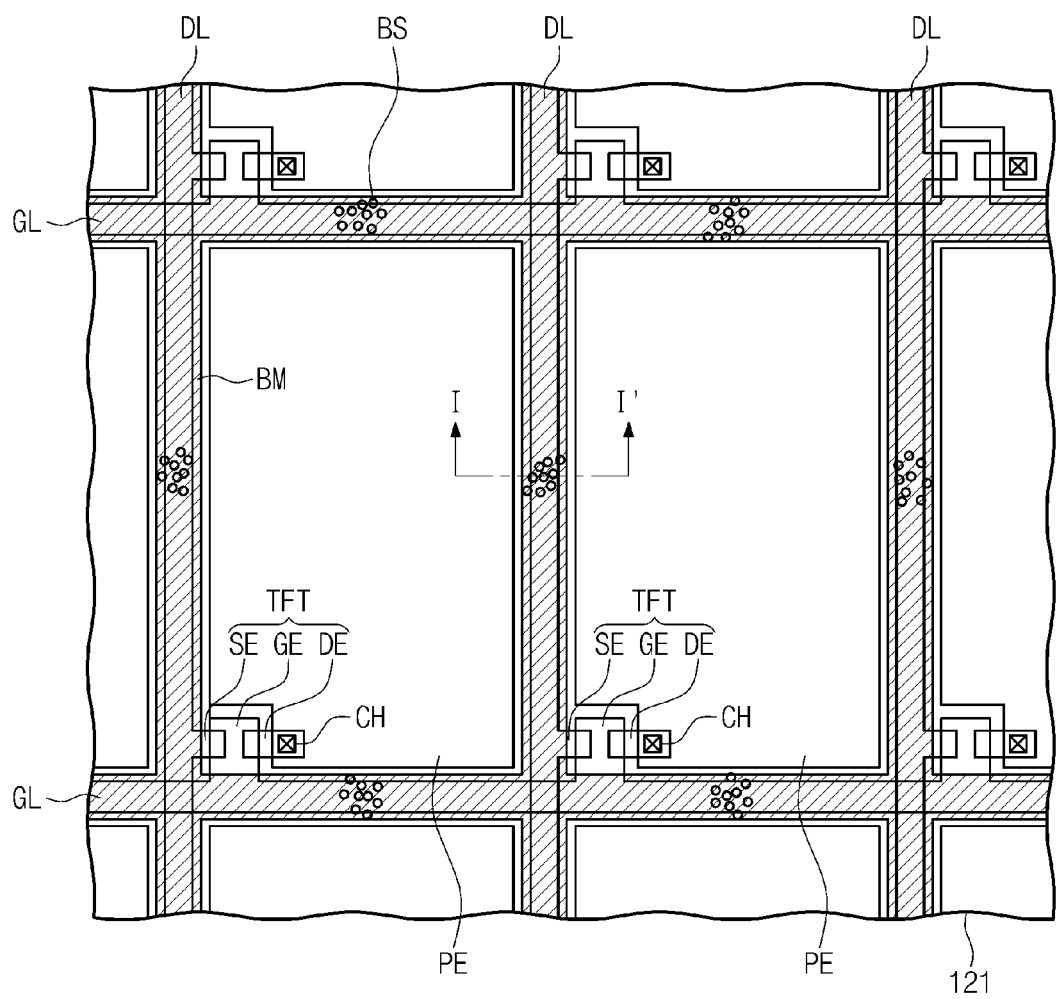
FIG. 4A is a plan view showing a first substrate of FIG. 1 according to an exemplary embodiment of the present invention.
Figure 4B:
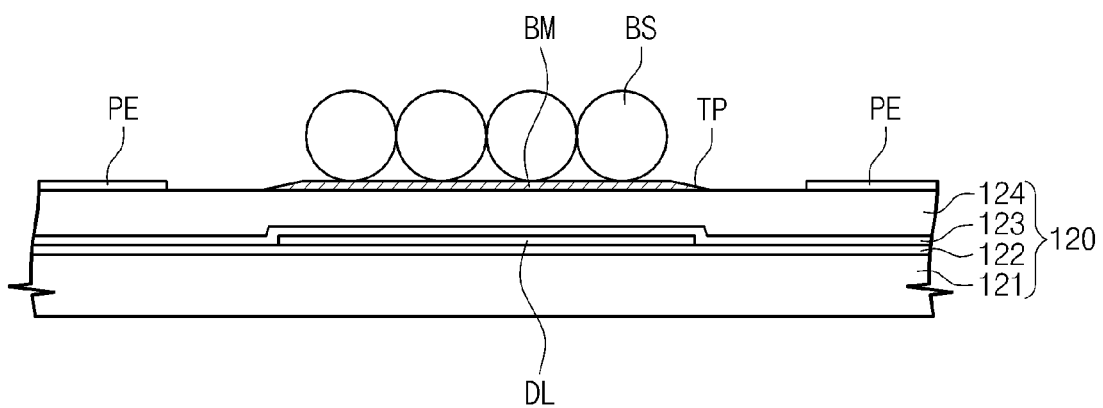
FIG. 4B is a cross-sectional view taken along a line I-I' of FIG. 4A.

FIG. 4A is a plan view showing a first substrate of FIG. 1 according to an exemplary embodiment of the present invention, and FIG. 4B is a cross-sectional view taken along a line I-I' of FIG. 4A. In FIGS. 4A and 4B, the same reference numerals denote the same or substantially the same elements as in the above-described exemplary embodiments.

Referring to FIGS. 4A and 4B, the first substrate 120 includes a first base substrate 121 and a plurality of pixels formed on the first base substrate 121.

The black matrix BM including a light blocking material is disposed between the adjacent pixels PE. The black matrix BM is disposed on the organic insulating layer 124 and absorbs or reflects light from an external source, thereby preventing the light from leaking between the two adjacent pixel electrodes PE.

In addition, the black matrix BM has a tapered portion TP at its end portion of which an upper surface is tapered toward the first substrate 120. That is, a distance between the upper surface of the black matrix BM and the upper surface of the first substrate 120 gradually decreases toward the end portion of the black matrix BM. In other words, as the black matrix BM is closer to a pixel electrode adjacent thereto, the upper surface of the black matrix BM becomes closer to the surface of the first substrate 120. The above-described shape of the end portion of the black matrix BM will be referred to as a "tapered shape" and the portion having the tapered shape will be referred to as the "tapered portion TP". According to an exemplary embodiment, an angle between the upper surface of the end portion of the black matrix BM and a surface of the first substrate 120 is equal to or greater than 35 degrees and smaller than 90 degrees.

Due to the tapered portion TP, the bead spacers BS may be easily gathered on the black matrix BM. Accordingly, the bead spacers BS may be stably disposed on the black matrix BM and maintained on the black matrix BM by the tapered portion TP, thereby maintaining the cell gap of the liquid crystal layer (not shown) between the first and second substrates 120 and 130.

Figure 5A:
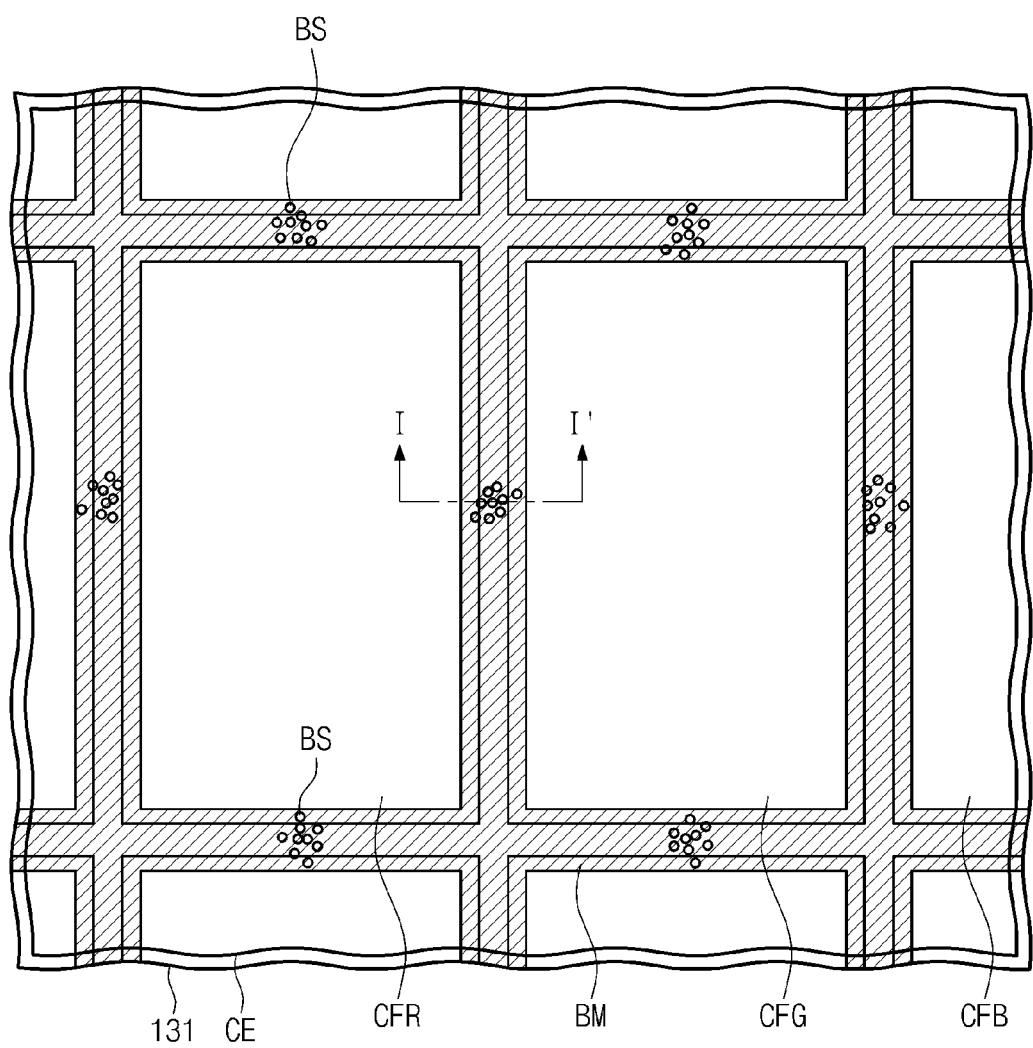
FIG. 5A is a plan view showing a second substrate of FIG. 1 according to an exemplary embodiment of the present invention.
Figure 5B:
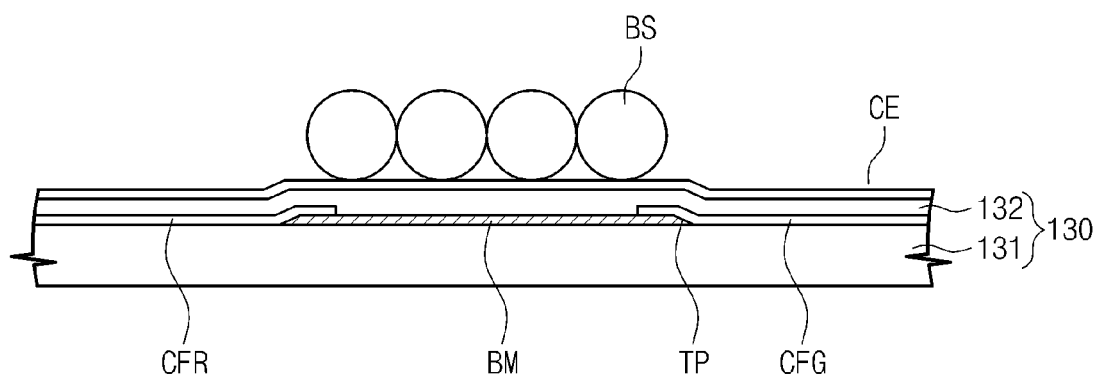
FIG. 5B is a cross-sectional view taken along a line I-I' of FIG. 5A.

FIG. 5A is a plan view showing a second substrate of FIG. 1 according to an exemplary embodiment of the present invention, and FIG. 5B is a cross-sectional view taken along a line I-I' of FIG. 5A.

Referring to FIGS. 5A and 5B, the second substrate 130 includes a second base substrate 131, a plurality of color filters CFR, CFG, and CFB, a leveling layer 132, and a common electrode CE.

The step differences in the color filters CFR, CFG, and CFB, the leveling layer 132, and the common electrode CE have been exaggerated for purposes of explanation.

The black matrix BM including a light blocking material is disposed on the second base substrate 131 of the second substrate 130 in a matrix configuration to prevent light leakage in a non-display area. The black matrix BM has a tapered portion TP at its end portion of which an upper surface is tapered toward the second substrate 130. According to an exemplary embodiment, an angle between the upper surface of the end portion of the black matrix BM and a surface of the second substrate 130 is equal to or greater than 20 degrees and smaller than 90 degrees.

The color filters CFR, CFG, and CFB are disposed on the second base substrate 131. Due to the tapered portion TP of the black matrix BM, the step difference between color filters CFR, CFG, and CFB disposed on the substrate 131 and on the tapered portion TP may be reduced.

The leveling layer 132 may be disposed on the color filters CFR, CFG, and CFB and the black matrix BM. The step differences occur in the leveling layer 132 due to the step differences in the color filters CFR, CFG, and CFB, and the step differences in the leveling layer 132 may be reduced by the tapered portion TP of the black matrix BM.

The common electrode CE is disposed on the leveling layer 132. The common electrode CE faces the pixel electrode PE to form an electric field.

The step differences in the common electrode CE corresponding to the end portions of the black matrix BM may be reduced by the tapered portion TP, so that the bead spacers BS may be easily gathered on the common electrode CE disposed on the black matrix BM. Thus, the bead spacers BS may be positioned on the common electrode CE corresponding to the black matrix BM, to thereby uniformly maintain the cell gap of the liquid crystal layer (not shown) disposed between the first substrate 120 and the second substrate 130.

As shown in FIGS. 5A and 5B, the second substrate 130 includes the color filters CFR, CFG, and CFB, the leveling layer 132, and the common electrode CE, but, according to an embodiment, the color filters CFR, CFG, and CFB, the leveling layer 132, and the common electrode CE may be omitted from the second substrate 130.

Figure 6A:
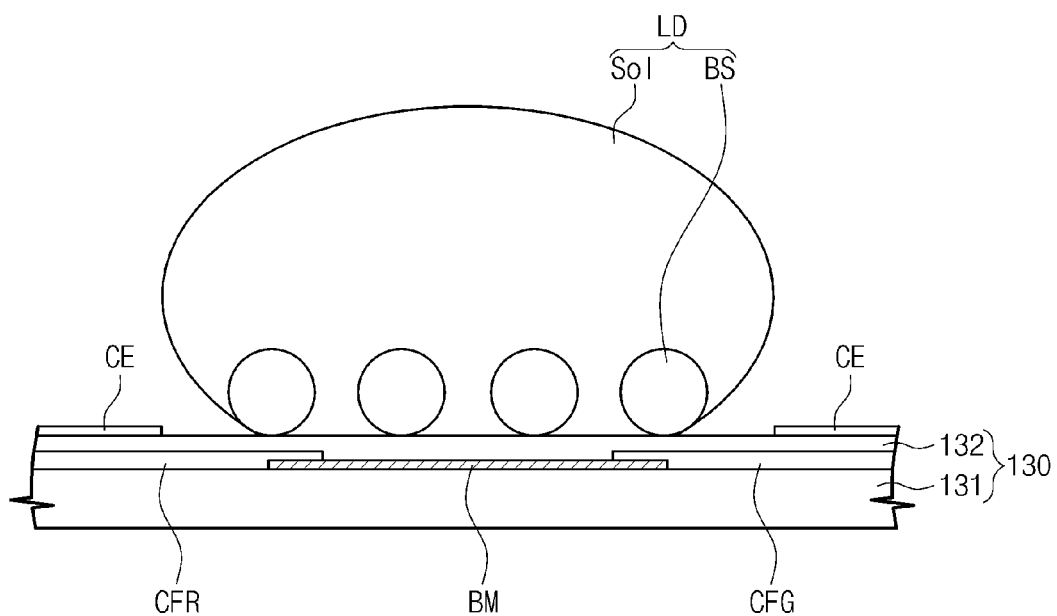
FIGS. 6A to 6C are views illustrating a method of manufacturing a display panel according to an exemplary embodiment of the present invention.
Figure 6B:
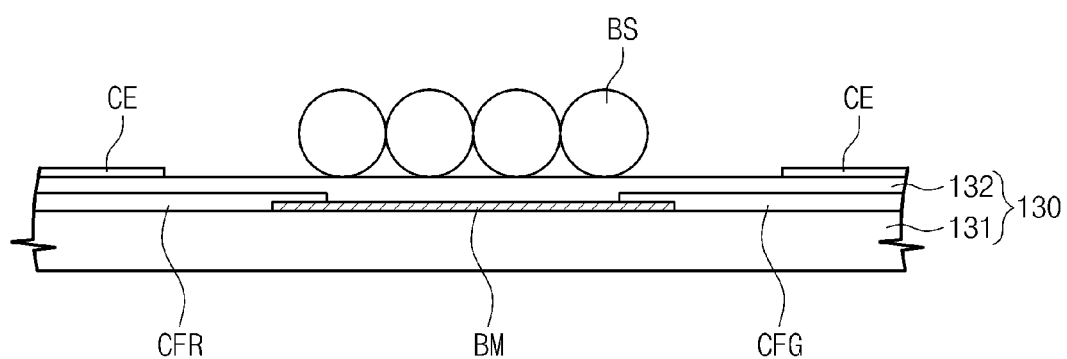
Figure 6C:
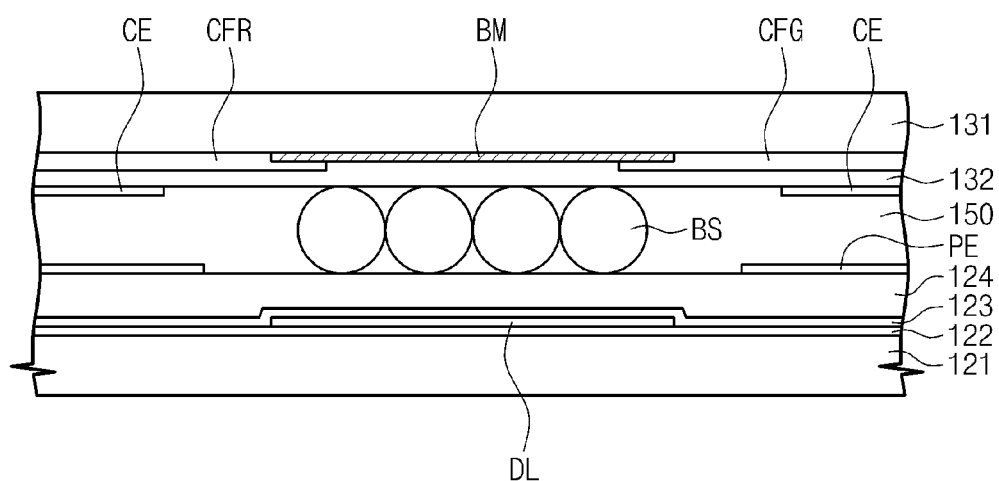

FIGS. 6A to 6C are views illustrating a method of manufacturing a display panel according to an exemplary embodiment of the present invention.

The black matrix BM, the color filters CFR, CFG, and CFB, the leveling layer 132, and the common electrode CE are formed on the second base substrate 131.

Then, the droplet LD including the bead spacers BS and the solvent Sol is positioned in the spacer area SA as shown in FIG. 6A.

Thereafter, when the solvent Sol is dried by baking the droplet LD, the bead spacers BS are gathered to a center of the spacer area SA and attached to the second substrate 130.

As shown in FIG. 6C, the first substrate 120 is coupled with the second substrate 130 with the bead spacers BS interposed between the first substrate 120 and the second substrate 130.

In FIGS. 6A to 6C, the first substrate 120 is coupled with the second substrate 130 after positioning the bead spacers BS on the second substrate 130, but the present invention should not be limited thereto or thereby. For example, according to an embodiment, the first substrate 120 may be coupled with the second substrate 130 after positioning the bead spacers BS on the first substrate 120.

Figure 7A:
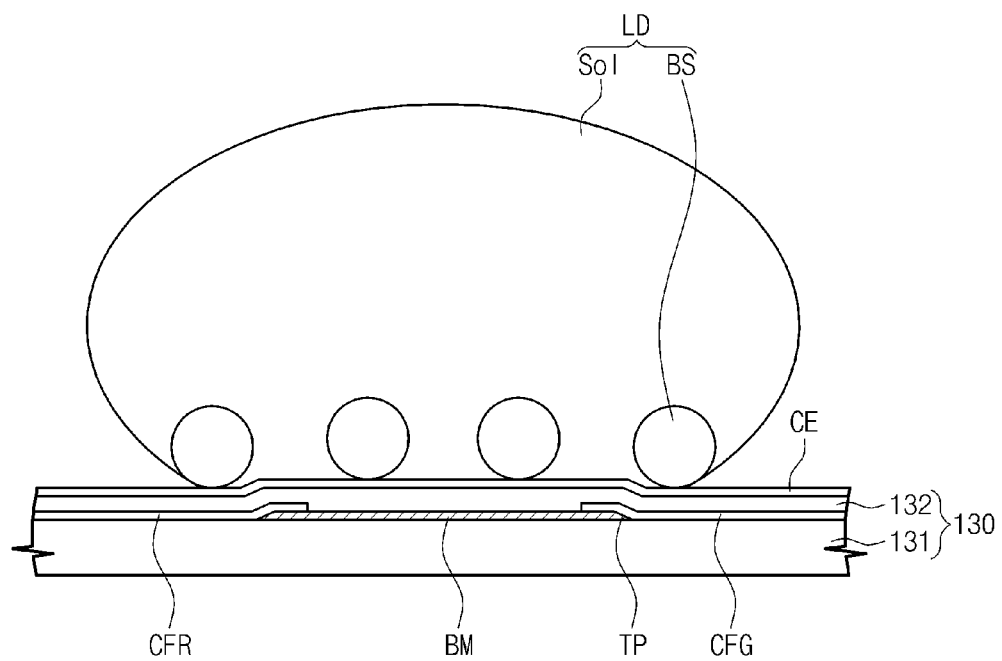
FIGS. 7A to 7C are views illustrating a method of manufacturing a display panel according to an exemplary embodiment of the present invention.
Figure 7B:
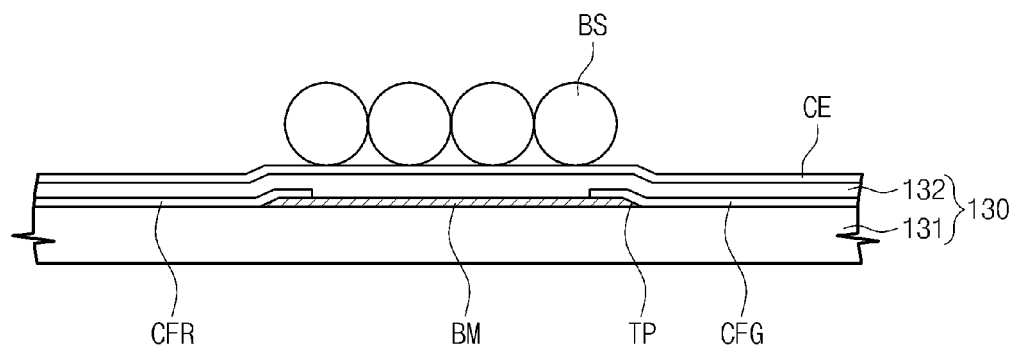
Figure 7C:
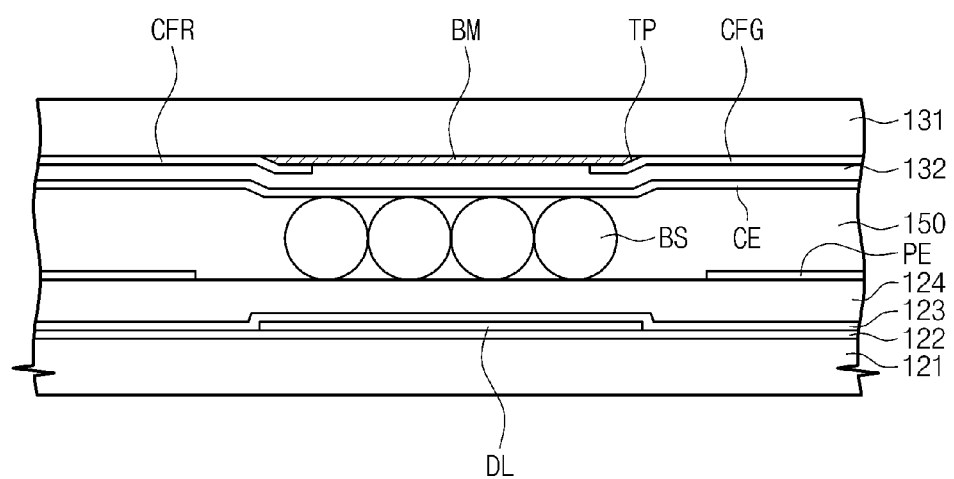

FIGS. 7A to 7C are views illustrating a method of manufacturing a display panel according to an exemplary embodiment of the present invention.

The black matrix BM having the tapered portion TP at its end portion, the color filters CFR, CFG, and CFB, the leveling layer 132, and the common electrode CE are formed on the second base substrate 131. In FIG. 7A, the common electrode CE is formed on the second substrate 131 to cover the black matrix BM, but may have an opening corresponding to the black matrix BM to define the spacer area SA.

Then, the droplet LD including the bead spacers BS and the solvent Sol is positioned on the common electrode CE over at least the black matrix BM.

Next, when the solvent Sol is dried as shown in FIG. 7B, the bead spacers BS are gathered on the spacer area SA above the black matrix BM and attached to the second substrate 130.

As shown in FIG. 7C, the first substrate 120 is coupled with the second substrate 130 with the bead spacers BS interposed between the first and second substrates 120 and 130.

In FIGS. 7A to 7C, the first substrate 120 is coupled with the second substrate 130 after positioning the bead spacers BS on the second substrate 130, but the present invention should not be limited thereto or thereby. For example, according to an embodiment, the first substrate 120 may be coupled with the second substrate 130 after positioning the bead spacers BS on the first substrate 120.

Figure 8A:
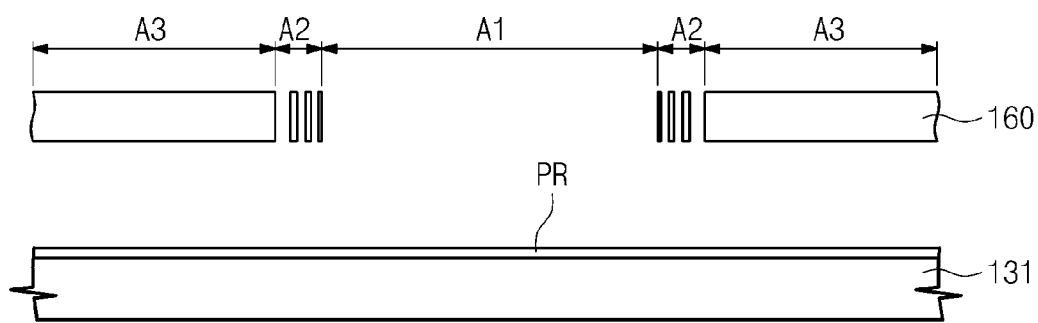
FIGS. 8A and 8B are views illustrating a method of forming a black matrix according to an exemplary embodiment of the present invention.
Figure 8B:
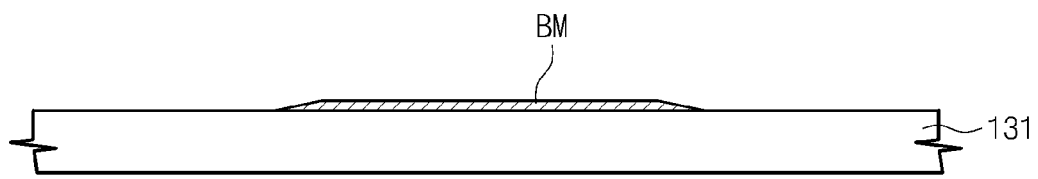

FIGS. 8A and 8B are views illustrating a method of forming the black matrix shown in FIGS. 4A to 5B according to an exemplary embodiment of the present invention.

Referring to FIG. 8A, a photoresist layer PR including a light blocking material is formed on the second base substrate 131 to have a uniform thickness. According to an exemplary embodiment, the photoresist layer PR is a negative type photoresist, but the present invention should not be limited thereto or thereby. For example, according to an embodiment, the photoresist layer PR may be a positive type photoresist.

A mask 160 is disposed above the photoresist layer PR to pattern the photoresist layer PR. The mask 160 includes a first area A1 in which an opening pattern is formed to expose the photoresist layer PR to light, a second area A2 in which a slit pattern is formed to partially expose the photoresist layer PR to the light, and a third area A3 in which no pattern is formed to block the light traveling to the photoresist layer PR.

In FIGS. 8A and 8B, the mask 160 including the slit pattern has been shown to partially pattern the photoresist layer PR corresponding to the second area A2, but the pattern of the second area A2 of the mask 160 should not be limited to the slit pattern. For example, according to an embodiment, a half-tone pattern may be formed in the second area A2 instead of the slit pattern.

Then, when the photoresist layer PR is exposed and developed after disposing the mask 160 above the photoresist layer PR, the black matrix BM is formed on the second base substrate 131 corresponding to the first and second areas A1 and A2. Specifically, the tapered portion TP of the black matrix BM is formed corresponding to the second area A2, and the second base substrate 131 is exposed since the photoresist layer PR corresponding to the third area A3 is removed from the second base substrate 131.

According to an exemplary embodiment, the black matrix BM includes an organic material, such as carbon, but the present invention should not be limited thereto. For example, according to an embodiment, the black matrix BM may be formed of a metal material, such as chromium (Cr), chromium oxide ($Cr_2O_3$).

Figure 9A:
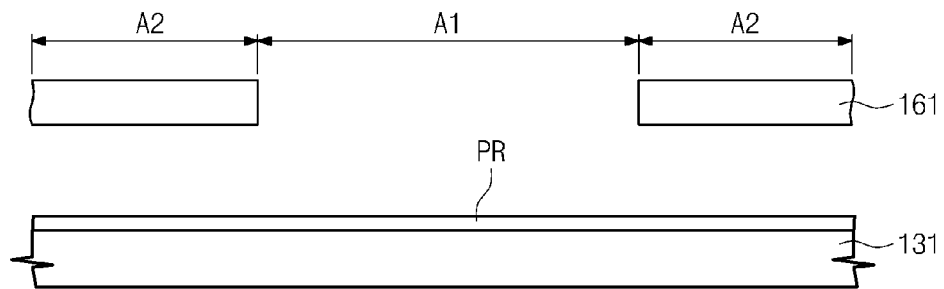
FIGS. 9A to 9C are views illustrating a method of forming a black matrix according to an exemplary embodiment of the present invention.
Figure 9B:
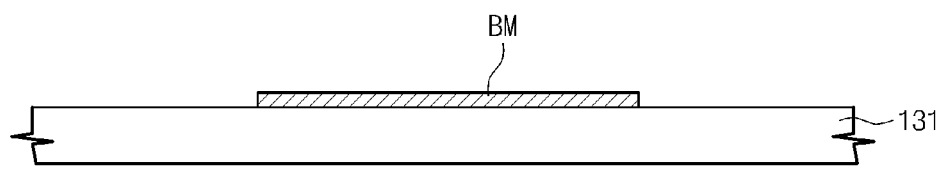
Figure 9C:
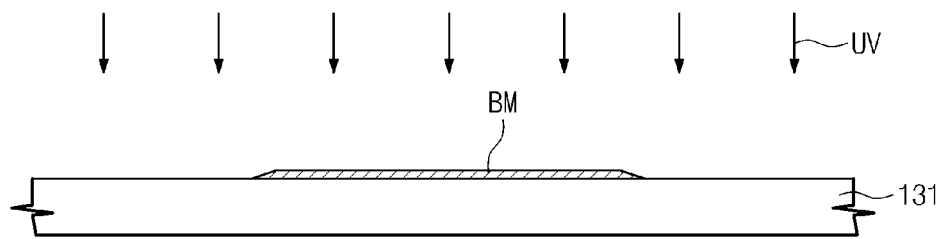

FIGS. 9A to 9C are views illustrating a method of forming the black matrix shown in FIGS. 4A to 5B according to an exemplary embodiment of the present invention.

Referring to FIG. 9A, a photoresist layer PR including a light blocking material is formed on the second base substrate 131 to have a uniform thickness. According to an exemplary embodiment, the photoresist layer PR is a negative type photoresist, but the photoresist layer PR should not be limited to the negative type photoresist. For example, the photoresist layer PR may be a positive type photoresist.

A mask 160 used to pattern the photoresist layer PR includes two areas. In detail, the mask 160 includes a first area A1 in which an opening pattern is formed to expose the photoresist layer PR to light and a second area A2 in which no pattern is formed to block the light traveling to the photoresist layer PR.

Then, when the photoresist layer PR is exposed and developed after disposing the mask 160 above the photoresist layer PR, the black matrix BM is formed on the second base substrate 131 corresponding to the first area A1 and the second base substrate 131 is exposed since the photoresist layer PR corresponding to the second area A2 is removed from the second base substrate 131.

Next, an ashing process is performed on the black matrix BM using an ultraviolet ray, and thus the tapered portion TP is formed at the end portion of the black matrix BM. According to an exemplary embodiment, the black matrix BM may be ashed by using plasma.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a display panel comprising:
   forming a first electrode and a second electrode spaced apart from each other by a predetermined distance on a first substrate;
   removing a portion of at least one of the first and second electrodes adjacent to each other to form a spacer area;
   providing a droplet including a bead spacer mixed with a solvent to the spacer area;
   vaporizing the solvent to move the bead spacer to a central portion of the spacer area; and
   providing a second substrate to face the first substrate and disposing the bead spacer between the first substrate and the second substrate,
   wherein the spacer area has a dimension equal to or greater than a diameter of the droplet.

2. The method of claim 1, wherein the removing is performed in an area where a distance between the first and second electrodes is smaller than the diameter of the droplet.

3. The method of claim 1, wherein forming the first and second electrodes and removing the portion of the at least one of the first and second electrodes are performed through a single patterning process.

4. The method of claim 3, wherein the spacer area has a circular shape.

5. The method of claim 1, wherein forming the first and second electrodes comprises:
   forming a black matrix on the first substrate, the black matrix having openings arranged in a matrix configuration,
   wherein the spacer area is formed in an area where at least the black matrix is formed.

6. The method of claim 5, wherein forming the first and second electrodes and removing the portion of the at least one of the first and second electrodes are performed through a single patterning process.

7. The method of claim 5, wherein forming the first and second electrodes further comprises forming a leveling layer on the first substrate, wherein the leveling layer is exposed through the spacer area.

8. The method of claim 5, wherein an end portion of the black matrix that defines the openings has a tapered shape.

9. A method of manufacturing a display panel, comprising:
   providing a light blocking material on a first substrate;
   patterning the light blocking material to form a black matrix through which openings are formed in a matrix configuration;
   providing a droplet including a bead spacer mixed with a solvent at least above an area where the black matrix is formed;
   vaporizing the solvent to move the bead spacer to above the area where the black matrix is formed;
   providing a second substrate to face the first substrate and disposing the bead spacer between the first substrate and the second substrate;
   forming a first electrode and a second electrode spaced apart from each other by predetermined distance on the first substrate;
   removing a portion of at least one of the first and second electrodes adjacent to each other to form a space area,
   wherein an end portion of the black matrix that defines the openings has a tapered shape.

10. The method of claim 9, wherein patterning the light blocking material is performed by using a diffractive exposure mask or a half tone mask.

11. The method of claim 9, wherein patterning the light blocking material comprises:
    patterning the light blocking material using a mask; and
    ashing the patterned light blocking material.

12. The method of claim 11, wherein the ashing is performed using an ultraviolet ray or a plasma.

13. The method of claim 9, wherein an angle between an upper surface of the end portion of the black matrix and a surface of the first substrate is equal to or greater than about 20 degrees and smaller than about 90 degrees.

14. A display panel including a bead spacer provided from a droplet including the bead spacer mixed with a solvent, comprising:
    a first substrate including a first electrode and a second electrode spaced apart from each other by a predetermined distance, wherein a portion of at least one of the first and second electrodes adjacent to each other is removed to form a spacer area;
    a second substrate facing the first substrate with the bead spacer interposed in the spacer area between the first substrate and the second substrate; and
    a plurality of pixels disposed on the first substrate or the second substrate,
    wherein the spacer area has a dimension equal to or greater than a diameter of the droplet.

15. The display panel of claim 14, wherein the first substrate comprises a black matrix between the first and second electrodes, and wherein the spacer area is positioned corresponding to the black matrix.

16. The display panel of claim 15, wherein the bead spacer is positioned on the black matrix.

* * * * *